Aug. 26, 1969   C. W. KRONBETTER   3,462,903
WEATHER STRIP
Filed Dec. 23, 1966

INVENTOR:
CLARENCE WALTER KRONBETTER

BY Campbell and Harris
by Thomas W. O'Rourke
ATTORNEYS

United States Patent Office 3,462,903
Patented Aug. 26, 1969

3,462,903
WEATHER STRIP
Clarence Walter Kronbetter, Benton Harbor, Mich., assignor to Ball Brothers Company Incorporated, Muncie, Ind., a corporation of Indiana
Filed Dec. 23, 1966, Ser. No. 604,297
Int. Cl. E06b 7/23; B60j 1/02; E04b 1/66
U.S. Cl. 52—400                    5 Claims

ABSTRACT OF THE DISCLOSURE

A resilient weather strip having grooves in opposite sides and a hinge point in the common leg between the grooves to increase the sealing forces generated when panels are inserted in the grooves.

---

Figure 2:
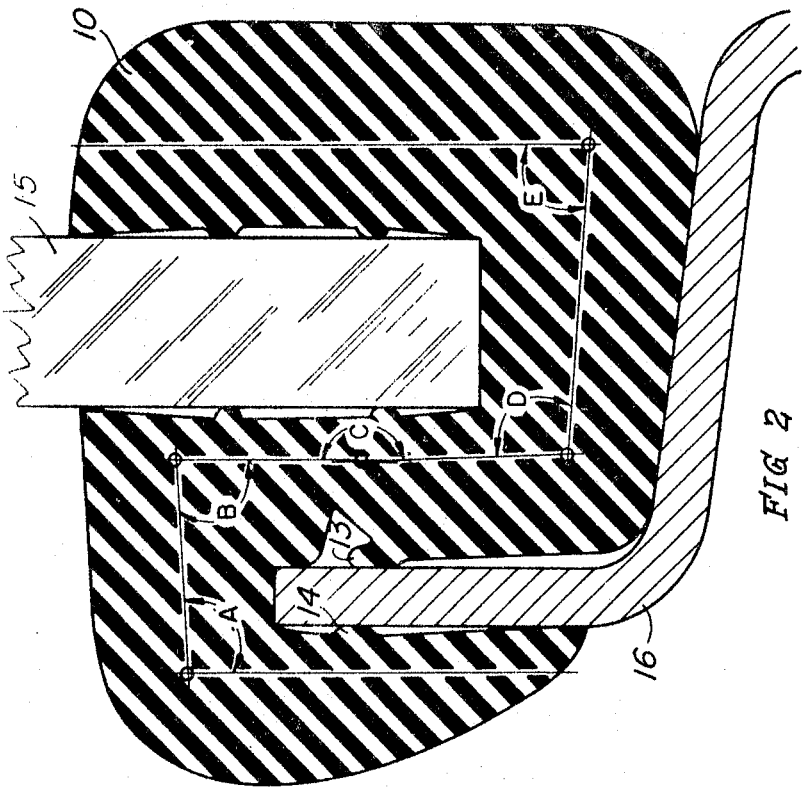

This invention relates to resilient weather strip and to weather strip assemblies for securing fixed panels, such as glass windshields, immovable side windows or rear windows, in vehicular bodies.

Openings are commonly left in vehicular bodies to accommodate panels, and particularly glass panes, in order to permit light and vision while maintaining protection against the elements. Clearly, it is important that the panels be accommodated in the openings in weather-tight manner. The usual weather strip or sealing strip employed to secure and seal such panels in vehicular bodies is an elastomeric strip having grooves and sealing surfaces to accommodate a flange or projection on the vehiclular body and also to receive the panel. Installation of the panels is facilitated by the resilient nature of the weather strip which permits the weather strip to be deformed to accommodate the body flange and/or panel. Also, the resilient nature of the weather strip permits the strip to be of such a configuration as to be deformed when the panel is secured therein. Such deformation urges the weather strip into intimate contact with the vehicular body and the panel thereby promoting sealing engagement between the weather strip and vehicular body or panel.

Quite commonly, the opening in the vehicular body is defined by a rib or flange consisting of, for instance, two sections of metal bent at angles and pinch welded together. Since the flange is covered by the weather strip, it is a convenient location to locate the pinch weld necessary to join the inner metal sections or bracings to the outer metal sections. The weather strip shields the pinch weld area from view and protects it from the elements. Also, it permits the outer metal section to form a pan or support which positions and cradles the portion of the weather strip which engages and supports the panel.

Conventionally, weather strip of the type of concern has been an elongated strip having a nominal top and bottom designation. A groove is longitudinally defined in the bottom of the strip and offset from the center portion of the strip. This groove is adapted to accept and engage, for instance, the flange formed by the pinch weld. Another groove is provided along the length of the weather strip in the top portion thereof, usually offset to the opposite side of the center portion as is the first groove. This second groove accommodates, supports, and seals against the panel. The portion of the weather strip directly below the panel engaging-groove is usually engaged and supported by a pan area formed by a portion of the material forming the flange. In the normal embodiment, a weather strip of the type described is, in cross section, formed of five legs. These are the flange outer leg, the flange and leg, the common leg, the panel and leg, and the panel outer leg. In very broad terms, the weather strip is of an S cross-section.

Hinge points are associated with the joinder of two legs. Such hinge points are produced by a notch, angle, or other discontinuity, in the surface of the weather strip. Hinge points are thus the points in cross-section around which two legs move when the legs are angularly flexed relative to one another.

Put another way, when a leg of resilient material is flexed, it bends smoothly producing compression at the inside of the curve and tension at the outside of the curve. Between the compression and tension portions, there is a portion of the leg which is neither in compression nor tension, but is relaxed. If the leg of resilient material is visualized as having center sections of this relaxed portion, which, of course, would be very thin, it will be appreciated that an even, smooth deformation of the center section occurs when the leg is flexed. However, when two legs are joined together at angles, the center sections of the legs intersect. When the two joined legs are moved relative to each other, each center section of a given leg deforms smoothly but, at the intersection of the center section of the legs, a change in the angle between the center sections occurs. The intersection of the center section, thus, is a discontinuity in the smooth deformation of the resilient material. Such discontinuity is, for the purposes of this disclosure, designated as a hinge point. Hinge points are produced by grooves or angular joinder of surfaces which disrupt the smooth compression-tension bending of a single leg by removing or adding material from a portion of the leg which would be under compression or tension.

According to the instant invention, a hinge point is provided in the common leg between the first groove and the second groove. This permits forces produced by deformation of the weather strip to be concentrated in critical sealing areas. One of the more critical sealing areas in the weather strip of concern is the seal with the flange. Thus, when the relatively thick panel is inserted in the panel groove, the preferred embodiment of the weather strip is deformed and the side portions of the flanged groove are forcedly urged against the flange to attain dependable sealing.

Figure 1:
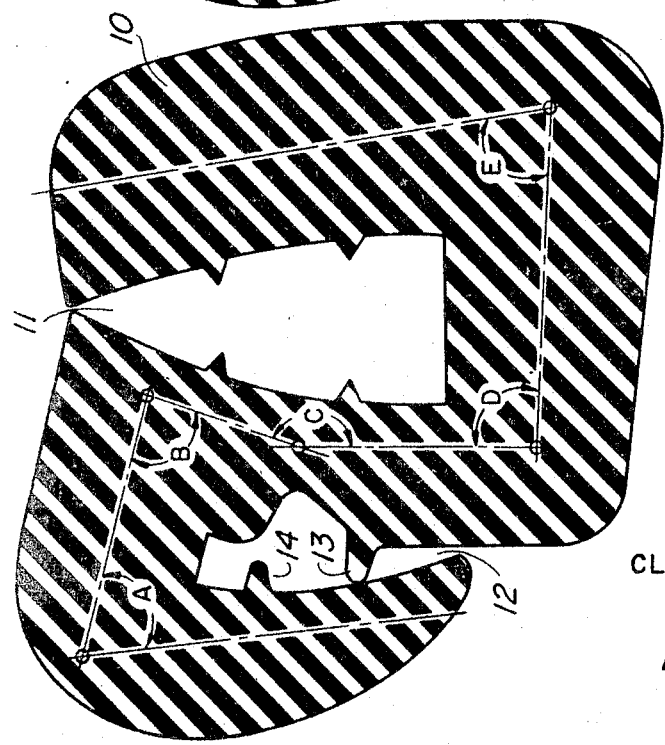

These and other objects and advantages of the weather strip of the present invention will be more clearly understood upon consideration of the following description and the accompanying drawing, in which:

FIGURE 1 is a cross-sectional view of the weather strip configuration of the instant invention in the relaxed or extruded state; and FIGURE 2 is a cross-sectional view of the weather strip configuration of the instant invention in the stressed or installed state.

With regard to FIGURE 1, weather strip 10 includes panel-accepting groove 11 and flange-accepting groove 12. Projections 13 and 14 are provided in the critical sealing areas of flange groove 12. Hinge point A is located at the intersection of the outside leg and the end leg of flange groove 12. Other conventional hinge points are hinge point B, hinge point D, and hinge point E. It will be noted that these hinge points are produced by the intersection of the inside surfaces of grooves 11 and 12. However, as will also be noted from FIGURE 1, hinge point C is produced by a notch in cross-section, or a longitudinal groove in the strip, occurring just beyond projection 13 in groove 12. Hinge point C is deliberately produced and not the result of normal, functional features of the weather strip as are the other hinge points.

The advantages accruing from hinge point C will be apparent upon consideration of FIGURE 2, wherein weather strip 10 accommodates panel 15. Groove 11, of course, is changed in shape by the insertion of panel 15 and weather strip 10 is accordingly deformed. In a conventional weather strip, not including hinge point C, such deformation would be accommodated by large measure within groove 12 by deformation around hinge point D. However, as will be noted from the very small change in angle of the legs meeting at hinge point D, in the instant invention such deformation is accommodated largely by deformation around novel hinge point C. Since the angular deformation around hinge point D would be about one-half the angular deformation around hinge point C, deformation around hinge point D in conventional configuration would not produce as much dislocation, or sealing force, at groove 12 as would deformation around novel hinge point C. Thus substantially greater pinching or sealing force results at groove 12. When flange 16 is inserted in groove 12, projections 13 and 14 are urged against flange 16 with substantially greater sealing force. It will be noted that the pan portion of the metal terminating in flange 16 lies directly below panel 15 and there supports gasket 10. However, this support is accomplished with relatively low forces and corresponding low pressures. Water often penetrates the relatively low pressure contact between gasket 10 and the supporting metal pan. For this reason, conventional weather strip of the type of concern tends to leak at the seal between groove 12 and flange 16. However, as has been explained above, the sealing forces of weather strip 10 of the instant invention are substantially greater at the critical area between groove 12, in particularly projections 13 and 14, and flange 16.

According to the instant invention, a relatively simple change in a weather strip of conventional cross section produces substantially increased sealing forces at the most critical portion of the weather strip. It will be apparent from the above description and drawings that various modifications in the structure of the gasket may be made within the scope of the invention. Therefore, the invention is not intended to be limited to specific configurations illustrated in detail herein except as may be required by the following claims.

What is claimed is:

1. A weather strip comprising an elongated strip of resilient material having defined therein a first longitudinal groove in a first side of said strip, a second longitudinal groove in an opposite second side of said strip as said first side, said two grooves being mutually offset and at least in part defined at the sidewall portions of the two grooves by a common leg therebetween, a further longitudinal hinge groove defined in the common leg sidewall portion of the first groove at a position in said sidewall spaced apart from said first groove bottom and whereat the common leg defines both the first and second grooves, and the sidewall portion of the common leg defining the second groove being concavely curved when relaxed.

2. A weather strip as set forth in claim 1 wherein said second groove is defined at the bottom by substantially right angle intersections between the sidewalls of the groove and the bottom wall thereof.

3. A weather strip as set forth in claim 1 wherein at least one of said grooves includes longitudinal projections on the side walls thereof.

4. A weather strip comprising an elongated strip of elastomeric material having defined therein two longitudinal grooves with one each of said grooves being on opposite sides of said strip as the other of said grooves, said two grooves being defined each at least at a portion of one sidewall by a leg therebetween common to both grooves, said common leg having defined in one of the groove sidewalls at a position spaced from said groove bottom a longitudinal hinge groove, the strip construction including a concave curvature in the common leg sidewall opposite the common leg sidewall including the hinge groove, the groove including the curved sidewall also having right angle intersections between the bottom of the groove and the sidewalls thereof.

5. A weather strip assembly as set forth in claim 4 wherein said grooves on opposite sides of said strip include longitudinal projections on the sidewalls thereof.

References Cited

UNITED STATES PATENTS

| 2,922,675 | 1/1960 | Wernig | 52—208 X |
| 3,078,119 | 2/1963 | Premo et al. | 296—93 X |
| 3,177,534 | 4/1965 | Millhouse et al. | 49—490 X |
| 3,338,015 | 8/1967 | Hoverman | 52—627 X |

FOREIGN PATENTS

| 979,676 | 1/1965 | Great Britain. |

ALFRED C. PERHAM, Primary Examiner

U.S. Cl. X.R.

52—208; 161—99

UNITED STATES PATENT OFFICE
CERTIFICATE OF CORRECTION

Patent No. 3,462,903                              August 26, 1969

Clarence Walter Kronbetter

It is certified that error appears in the above identified patent and that said Letters Patent are hereby corrected as shown below:

Column 4, after line 40 insert
        1,185,073   1/1965   Germany

Signed and sealed this 17th day of February 1970.

(SEAL)
Attest:

Edward M. Fletcher, Jr.                     WILLIAM E. SCHUYLER, JR.
Attesting Officer                                       Commissioner of Patents